United States Patent [19]

Kobler et al.

[11] 3,724,859

[45] Apr. 3, 1973

[54] CASSETTE MAGNETIC TAPE RECORDER

[75] Inventors: Richard Kobler, Zug, Switzerland; William F. Fagan, Rochelle Park; Edward Feldman, Teaneck, both of N.J.

[73] Assignee: McGraw-Edison Company, Elgin, Ill.

[22] Filed: Nov. 15, 1971

[21] Appl. No.: 198,875

[52] U.S. Cl. ....................274/4 D, 242/200, 242/201, 242/207, 242/208

[51] Int. Cl. ..........................................G11b 15/24

[58] Field of Search......242/199, 200, 201, 202, 204, 242/208; 274/4 D, 4 C, 4 E, 11 D, 11 C

[56] References Cited

UNITED STATES PATENTS

| | | | |
|---|---|---|---|
| 3,073,540 | 1/1963 | Guest | 242/201 |
| 3,130,935 | 4/1964 | Aldrige | 242/208 |
| 3,531,575 | 9/1970 | Kobler et al. | 242/200 |
| 3,612,433 | 10/1971 | Patten | 242/201 |

*Primary Examiner*—Louis R. Prince
*Assistant Examiner*—Dennis A. Dearing
*Attorney*—George H. Fritzinger

[57] ABSTRACT

A tape recorder using a cassette type magazine is electrically controlled from a remote station with provision of suitable interlocks in the electrical control system to enable the user to select normal forward drive in recording or reproducing, fast (scan) rewind drive or fast-forward drive.

16 Claims, 6 Drawing Figures

INVENTORS
RICHARD KOBLER
WILLIAM F. FAGAN
BY EDWARD FELDMAN

George H. Fritzinger
AGENT

INVENTORS
RICHARD KOBLER
WILLIAM F. FAGAN
BY EDWARD FELDMAN

George H. Fritzinger
AGENT

INVENTORS
RICHARD KOBLER
WILLIAM F. FAGAN
EDWARD FELDMAN
BY
George H. Fritzinger
AGENT

CASSETTE MAGNETIC TAPE RECORDER

An object of the invention is to provide a remotely operable electrical control system for a tape recorder which is simple and reliable.

Another object is to provide such electrical control system for shifting a head carrier plate and for selectively coupling the drive motor with the supply and take-up reels as the carrier plate is shifted to disengage the head from the tape.

Another object is to provide such electrical control system comprising scan, fast-forward and unlatching solenoids wherein the machine is shifted into fast rewind as the scan solenoid in energized, fast-forward as the fast-forward solenoid is energized and normal record-reproduce as the unlatching solenoid is energized.

These and other objects and features of the invention will be apparent from the following description and the appended claims.

In the description of our invention, reference is had to the accompanying drawings of which:

Figure 2:
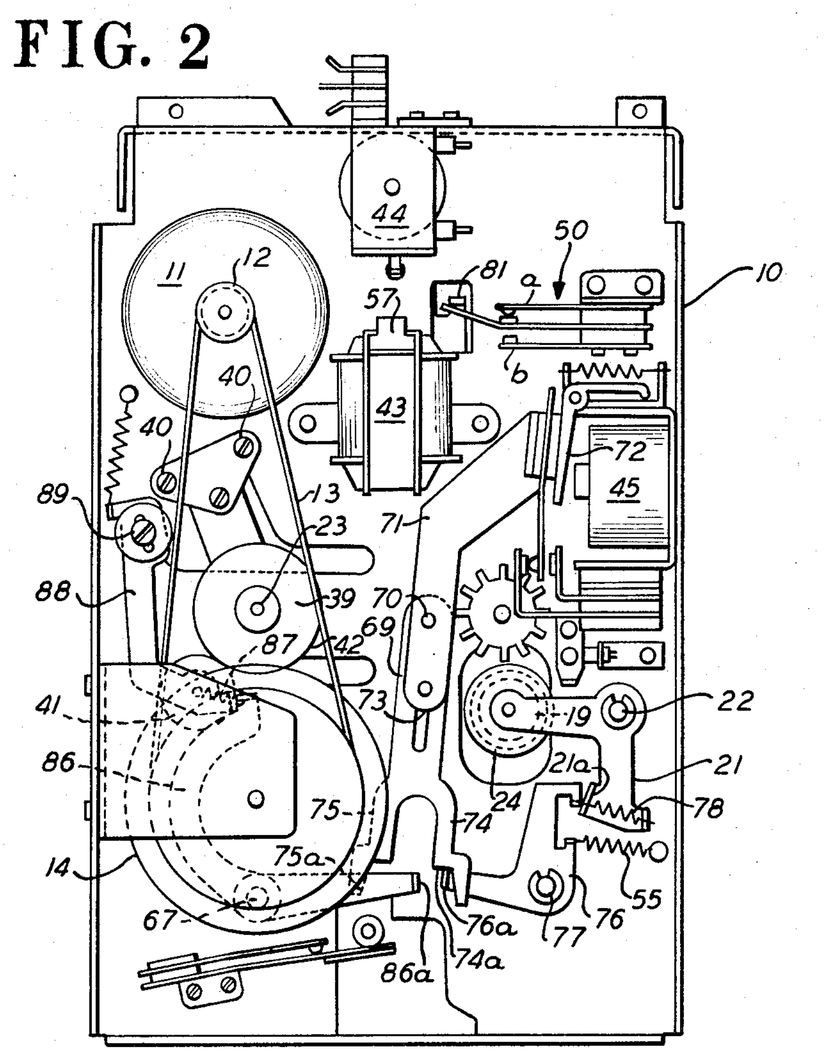
FIG. 2 is a bottom plan view of this tape recorder.

The tape recorder has a frame 10 in the right rearward portion of which is mounted a drive motor 11 in a vertical position. The drive motor has a drive pulley 12 at its lower end coupled by a belt 13 to a flywheel 14 journaled on a vertical axis in the forward right hand portion of the frame 10. A pulley 15 is secured to the flywheel above the frame plate. A shaft extends upwardly from the pulley forming a capstan 16 for driving a magnetic tape of a cassette 17 of the tape recorder. A belt 18 couples the pulley 15 to a supply reel pulley 19 and to a take-up reel pulley 20. As will appear, the supply reel pulley 19 may also be referred to as a rewind drive pulley and the take-up reel pulley 20 as a fast-forward drive pulley. The rewind drive pulley is journaled on a bell crank lever 21 pivoted at 22 to the underside of the frame. (FIG. 2). The fast-forward drive pulley 20 is however journaled at 23 to the frame 10. The reason for the rewind pulley 19 being journaled to a shiftable bell crank lever 21 is to permit a gear 24 rigidly secured to the pulley 19 to be shifted into and out of engagement with a gear 25 secured to a hub 26 having ribs **26*a* for receiving a reel with a supply roll of tape. Similarly, a hub 27 is clutched to the take-up reel pulley 20 and provided with ribs 27*a*** for receiving a reel for taking up the tape fed from the supply reel.

Figure 1:
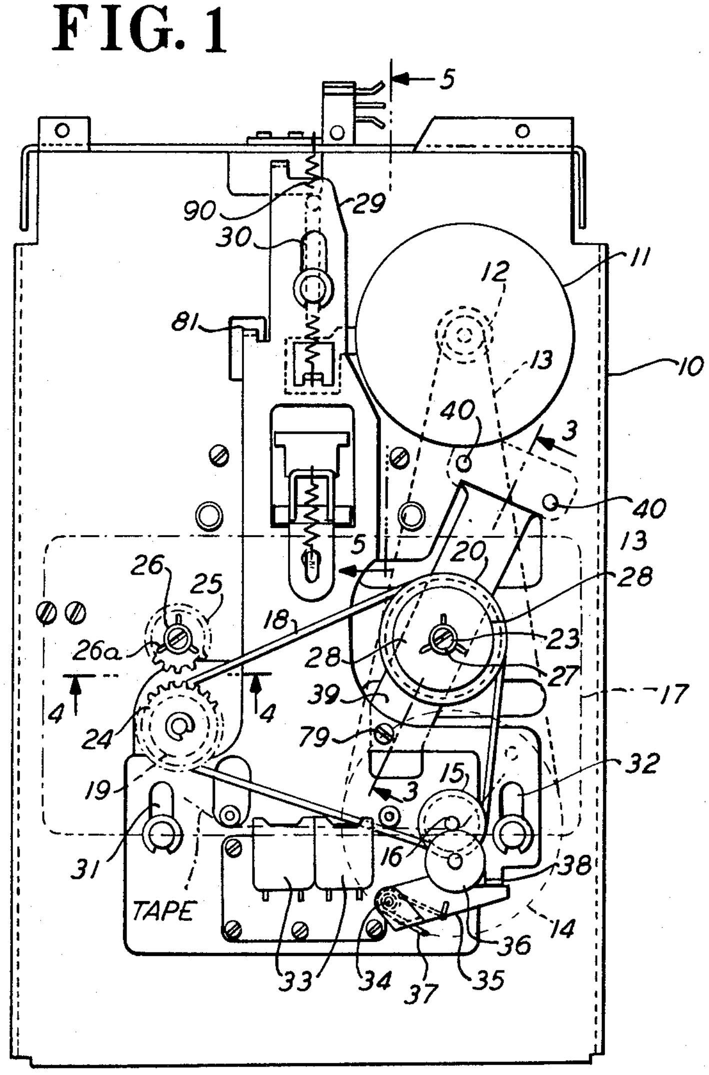
FIG. 1 is a top plan view of a tape recorder according to the invention.
Figure 5:
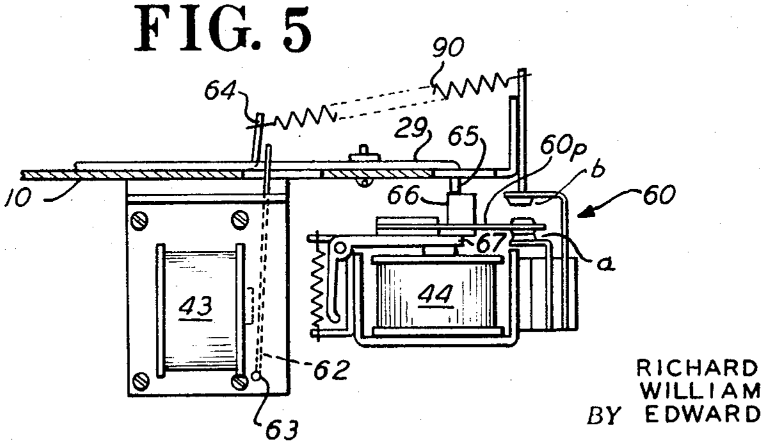
FIG. 5 is a sectional view on the line 5—5 of FIG. 1 showing a side view of the scan and unlatching solenoids.

A head carrier plate 29 is slidably mounted on the top side of the frame 10 by means of a pin slot coupling 30 at the back end of the machine and pin slot couplings 31 and 32 at the left and right sides of the front portion of the machine. This plate carries one or more recorder-reproducer heads 33 at its forward end portion oriented so that the magnetic gaps will engage the tape when the plate is in a rearward or unlatched position. (FIGS. 1 and 5). Pivoted to the head carrier plate at 34 (FIG. 1) is a lever 35 on which is journaled a pinch roller 36 in a position frontwise of the capstan 15 relative to the machine. This pinch roller is urged by a torsion spring 37 rearwardly against a stop lug 38 on the head carrier plate. When the head carrier plate is in its most rearward position the pinch roller 36 is under pressure against the capstan 15 to drive the tape at a slow forward direction for recording or reproducing. At the same time, as will appear, the gears 24 and 25 are disengaged to leave the supply reel in a free state so that the tape can be drawn freely from the supply reel. However, the take-up pulley 20 is now urged by a flat cantilever spring 39 secured at 40 to the frame 10 in an upward direction against a flange 28 of the hub 27 providing a friction-slip coupling between the pulley and the hub. The hub is thereby over-driven so that it tends to wind up the tape ahead of the capstan.

In the operation of a tape recorder the user will shift the machine between three operating conditions: (1) the regular slow forward drive for recording and reproducing wherein the pinch roller 36 engages the capstan 15, the take-up hub 27 is coupled by the slip clutch 20–28 to the take-up drive pulley 20 and the supply reel hub 26 is uncoupled from the rewind drive pulley 19, (2) a fast rewind condition in which the pinch roller 36 is disengaged from the capstan 15, the clutch 20–28 is disengaged and the rewind drive pulley 19 is coupled by the gears 24–15 to the supply reel hub 26 to drive the hub at a fast speed from the capstan drive pulley 16, and (3) a fast forward condition wherein the pinch roller 36 is again disengaged from the capstan 15, the gears 24 and 25 are disengaged to leave the supply reel hub in a free state, and the slip clutch 20–28 is again disengaged but the take-up reel hub 27 is driven in a fast forward direction by an idler roller 41 now engaged between the flywheel 14 and a disk-shaped drive wheel 42 fixed to the shaft of the take-up hub 27. In accordance with the present invention, the tape recorder-reproducer is controlled remotely so that the operator can select between these three operating conditions from a remote station by activating selectively three different solenoids: a scan solenoid 43, an unlatching solenoid 44 and a fast-forward solenoid 45.

Figure 6:
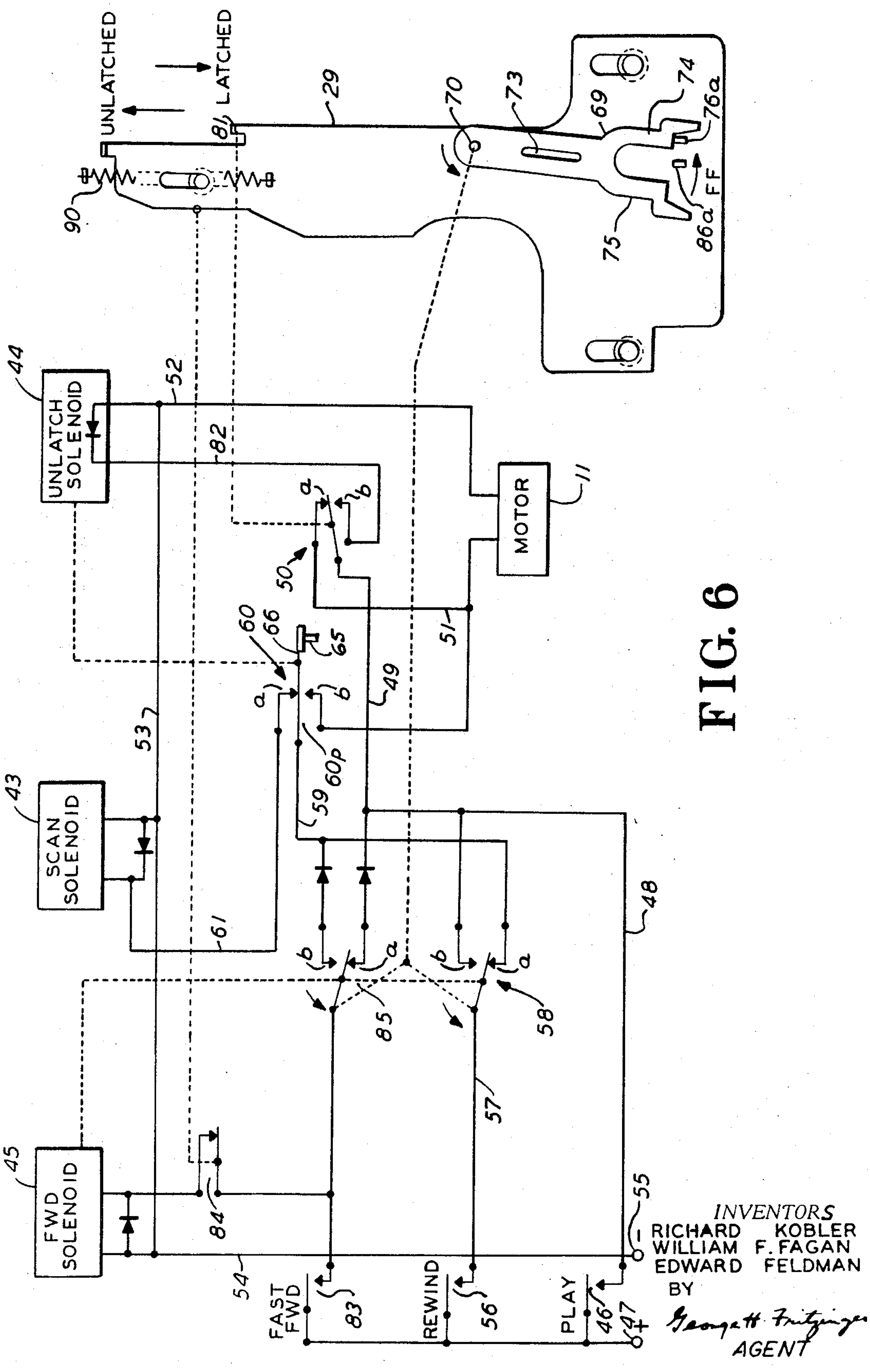
FIG. 6 is a schematic circuit diagram of the electrical control system of the tape recorder, including a bottom view of the carrier slide plate.

In the record-reproduce condition of the machine the solenoids 43–45 are deenergized and the head carrier plate 29 is biased by a spring 90 in its rearward unlatched position. This places the heads 33 in engagement with the tape and biases the pinch roller 36 against the capstan 16. When the operator closes a "-play" switch 46 (FIG. 6) a plus terminal 47 of a d. c. power supply is completed via leads 48 and 49, switch 50 contact *a*, lead 51, motor 11 and leads 52–54 to negative terminal 55 to start the motor running to drive the tape in a slow forward direction. During this drive, gears 24–25 are disengaged to leave the supply reel in a free unwinding condition, and the slip clutch 20–28 is engaged to cause the tape to be taken up ahead of the capstan.

To shift the machine into fast rewind condition the operator presses the rewind switch 56. This completes a circuit from the plus terminal 47 via lead 57, switch 58 contact *a*, lead 59, switch 60 contact *a*, lead 61, scan solenoid 43 and leads 53 and 54 to the negative terminal 55 to energize the scan solenoid. The scan solenoid has an armature 62 (FIG. 5) pivoted to the lower side of the solenoid frame at 63, which when the solenoid is energized is driven against lug 64 on the carrier plate 29 to shift the carrier plate forwardly. As the carrier plate is so shifted, a lug 65 struck downwardly therefrom rides off the head of a latch pawl 66 and latches the carrier plate. This latch pawl is secured to the armature 67 of the unlatch solenoid 44, and carries a pole 60*p* of the switch 60. As the lug 65 rides off the head of the latch pawl 66 the pawl is snapped to cause the pole 60*p* to break with contact *a* to deenergize the scan solenoid and to make with contact *b* to complete a circuit to the drive motor 11. In this latched position of the carrier plate 29 the head 33 and pinch roller 36 are held disengaged from the tape.

Figure 3:
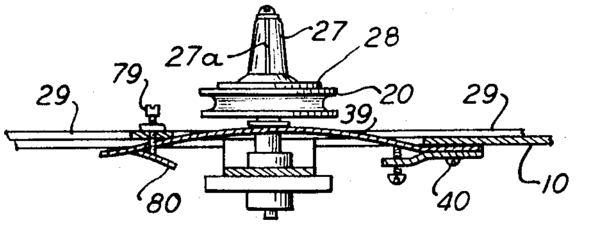
FIG. 3 is a fractional sectional view on the line 3—3 of FIG. 1.
Figure 4:
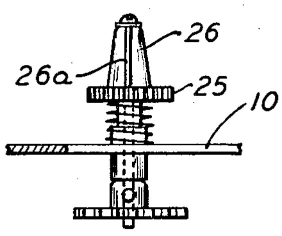
FIG. 4 is a fractional sectional view on the line 4—4 of FIG. 1.

Further, as the carrier plate 29 was shifted forwardly into its latched position by the scan solenoid 43, a drive selector link 69 pivoted at 70 to the underside of the carrier plate 29 was held in its clockwise position shown in FIG. 2 by an arm 71 of an armature 72 of the fast forward solenoid 45 not now energized, the arm having a pin slot coupling 73 with the link 69 as shown. The selector link has a forked end portion providing it with two spaced fingers 74–75 having abutments 74*a* and 75*a* at the ends thereof equally radially spaced from the pivot 70. The abutment 74*a* now registers with a lug 76*a* of a bell crank lever 76 pivoted at 77 to the underside of the frame 10, which lever has an arm held by a spring 78 against a lug 21*a* of the lever 21 carrying the gear 24. As the carrier plate 29 was shifted by the scan solenoid 43 into a latched position the link 69 moved the lever 76 counterclockwise which in turn pulled the lever 21 clockwise via the spring 78 (FIG. 2) to engage the gear 24 with the gear 25. At the same time an adjustable screw 79 on the carrier plate 29 moved against an inclined lug 80 on the clutch spring 39 (FIG. 3) to cause the slip clutch 20–28 to open. Thus, the take-up reel 23 is now in a free condition and the supply reel 27 is now driven fast reverse to rewind the tape.

When in placing the machine in rewind condition the carrier plate 29 was shifted into its latched position, a lug 81 moved the switch 50 (FIGS. 2 and 6) from contact *a* to contact *b*. If the operator next presses the play switch 46 to restore the machine back to normal record or reproduce condition, the unlatch solenoid 44 is actuated from the terminals 47 and 55 via the switch 50 contact *b*, lead 82, unlatch solenoid 44 and leads 53 and 54 to release the latch pawl 66 and cause the carriage plate 29 to be pulled back by the spring 90 into its unlatched position. This restores the head 33 and pinch roller 36 in contact with tape, disengages the supply hub gears 24 and 25 and reengages the take-up slip clutch 20–28. At the same time the switch 50 is returned to contact *a* to deenergize the unlatch relay 44 and start the motor 11. The machine is now back into slow forward drive for recording or reproducing.

If the operator next presses the fast-forward switch 83, the fast-forward solenoid 45 is activated from the terminals 47 and 55 via a carriage switch 84. Operation of this solenoid shifts the switch 58 and its companion switch 85 from their *a* to *b* contacts. Switch 85*b* now completes a circuit via lead 59, switch 60 contact *a*, lead 61, scan solenoid 43 and leads 53 and 54 across power terminals 47 and 55 to activate the scan solenoid 43, but before this switch operation was completed the fast-forward solenoid 45 had shifted the drive selector link 69 counterclockwise to bring the abutment 75*a* in registration with the lug 86*a* of the fast-forward control lever 86 pivoted at 87 to the underside of the frame 10. Thus, as the scan solenoid propels the carrier plate 29 into its latched position responsive to pressing the fast-forward switch 83 it turns the lever 86 clockwise, as seen in FIG. 2. Lever 86 is spring coupled at 87 to lever 88 having a floating pivot at 89 to the under side of the frame 10. Journaled to the lever 88 is the idler roller 41 which as the lever 88 is so turned by lever 86 is moved between flywheel 14 and drive wheel 42 to couple the flywheel directly to the supply reel. Also, at the same time that the carrier plate 29 was moved to its latched position by the scan solenoid 43, it cammed the clutch spring 39 to disengage the take-up slip clutch 20–28. Further, the scan solenoid 43 was now deenergized and the motor 11 started by the shift of the switch 60 from *a* to *b* contacts as the latch pawl 66 snapped over the lug 65. Thus, the machine is now in fast-forward drive but the fast-forward solenoid 45 is now also no longer energized because the switch 84 was opened as the scan solenoid 43 shifted the carriage plate 29 into its latched position. Although the switches 58 and 85 of the fast-forward solenoid are biased into their *a* positions by the spring mounting of the armature of the solenoid, they are now retained in their *b* positions because as the carrier plate 29 was shifted into its last position while the selector link 70 was in its fast-forward position, it carried the abutment 74*a* past the lug 76*a* of the lever 76 thereby latching the selector link in its operated position — the position into which it was shifted when the fast-forward solenoid 45 was energized.

If the operator presses the rewind switch 56 while the machine is in fast-forward condition, a first result is to activate the unlatch relay 44 via the switch 58*b*, lead 49, switch 50*b*, lead 82, unlatch solenoid 44 and leads 53 and 54 to unlatch the carriage plate, causing the carriage plate to be returned rearwardly to unlatched position. This allows the drive selector link 69 to return into its biased rewind position. However, during the process of unlatching the carriage plate 29 the switch 60 was shifted from *b* to *a* contacts to stop the motor 11 and reactivate the scan solenoid 43 to shift the machine from normal drive condition to rewind condition as before described.

If the operator next presses the fast forward switch 83 while the machine is in rewind condition, the same action of first returning the carriage plate 29 to unlatched position occurs since now the unlatch solenoid 44 is first activated via the switch 50*b* to return the carriage plate to unlatched position, and then the sequence of operations is the same as described above when the operator pressed the fast-forward switch 83 while the machine was in "play" condition.

The description of our invention herein particularly shown and described is intended to be illustrative but not necessarily limitative of our invention since the same is subject to changes and modifications without departure from the scope of our invention, which we endeavor to express according to the following claims.

We claim:

1. In a tape recorder machine including supply and take-up reels for a tape, a drive motor, a record-reproduce head, a drive capstan and a pinch roller for engaging the tape with said capstan: the combination of a carrier plate for said head and pinch roller shiftable in retracting and return directions respectively to disengage and engage said head and pinch roller with the tape, first and second shiftable means for coupling said drive motor respectively to said supply and take-up reels to drive the tape in scan rewind and scan forward directions, and selector means on said carrier plate shiftable into rewind and fast-forward positions for causing said first and second coupling means to be actuated respectively during the retracting movement of said carrier plate.

2. The combination set forth in claim 1 including a latch member for latching said carrier plate in retracted position, and means responsive to the latching of said carrier plate for starting said drive motor.

3. The combination set forth in claim 1 including a latch member for latching said carrier plate in retracted position, a scan solenoid for retracting said carrier plate, and means responsive to the latching of said carrier plate for deenergizing said scan solenoid.

4. The combination set forth in claim 1 including a latch member for latching said carrier plate in retracted position, an unlatching solenoid for releasing said latching member, and means responsive to a return of said carrier plate from a latched position for deenergizing said unlatching solenoid.

5. The combination set forth in claim 1 including a latch member for latching said carrier plate in retracted position, a fast-forward solenoid for shifting said selector means into fast-forward position, means controlled by the positioning of said carrier plate for activating said fast-forward solenoid only when said carrier plate is in a return position, and means operated by said carrier plate as the same is shifted into a retracted position for deenergizing said fast-forward solenoid.

6. The combination set forth in claim 5 including a scan solenoid for shifting said carrier plate into retracted position, and means responsive to an activation of said fast-forward solenoid for activating said scan solenoid to place said machine in a fast-forward drive condition.

7. The combination set forth in claim 6 including means responsive to the latching of said carrier plate in retracted position for deenergizing said scan solenoid.

8. The combination set forth in claim 7 wherein said carrier plate is spring-biased into return position and said selector means is spring-biased to rewind position, including an unlatching solenoid operable only when said carrier plate is in a latched position for releasing said latching member, and means responsive to a return of said carrier plate for deenergizing said unlatching solenoid.

9. The combination set forth in claim 1 wherein said selector means is shiftable between rewind and fast-forward position only when said carrier plate is in a return position, including means for latching said selector means against shifting movement when said carrier plate is in retracted position.

10. The combination set forth in claim 9 including spring means biasing said selector means in rewind position, a fast-forward solenoid for shifting said selector means into fast-forward position, a scan solenoid for retracting said carrier plate, means responsive to a retracting of said carrier plate for deenergizing said fast-forward solenoid, and means responsive to a latching of said carrier plate in retracted position for deenergizing said scan solenoid.

11. The combination set forth in claim 1 including a latch means for latching said carrier plate in retracted position, a rewind control switch, and circuit means responsive to closing said rewind control switch when said selector means is in rewind position and said carrier plate is in latched position for starting said drive motor.

12. The combination set forth in claim 11 including a scan solenoid for shifting said carrier plate into retracted position, means biasing said selector means in rewind position, and circuit means responsive to closing said rewind control switch while said carrier plate is unlatched for activating said scan solenoid to shift said machine into rewind condition.

13. The combination set forth in claim 12 including a fast-forward solenoid for shifting said selector means into fast-forward position, an unlatching solenoid for releasing said latch means, and circuit means responsive to pressing said rewind control switch while said carrier plate is latched in retracted position and said selector means is held in fast-forward position for activating said unlatching solenoid to return said carriage plate and allow return of said selector means to rewind position by said biasing means and thereupon to activate said scan solenoid to shift said carrier plate back into retracted position while said selector means is in rewind position to start said machine in fast rewind.

14. The combination set forth in claim 1 including a latch means for latching said carrier plate in retracted position, a fast-forward solenoid for shifting said selector means into fast-forward position, a fast-forward control switch, and circuit means responsive to closing said fast-forward control switch while said carrier plate is latched in retracted position and said selector means is in fast-forward position for starting said drive motor to put said machine in fast-forward drive.

15. The combination set forth in claim 14 including a scan solenoid for retracting said carrier plate into latched position, and circuit means responsive to pressing said fast-forward control switch closed while said carriage is in return position and said selector means is in rewind position for activating said fast-forward solenoid to shift said selector means into fast-forward position and for activating thereupon said scan solenoid to retract said carriage plate to latch position, means responsive to the movement of said carriage plate into latched position for deenergizing said fast-forward solenoid, and means responsive to the latching of said carrier plate in retracted position for starting said drive motor to put said machine in fast-forward drive.

16. The combination set forth in claim 15 including an unlatching solenoid for releasing said latch means, means responsive to return of said carrier plate for activating said fast-forward solenoid to shift said selector means into fast-forward position, and means responsive to said selector means being shifted to fast-forward position to activate next said scan solenoid to retract said carrier plate into latched position and thereupon to start said drive motor to put said machine into fast-forward drive.

* * * * *